United States Patent [19]

Helgeland et al.

[11] 4,395,010

[45] Jul. 26, 1983

[54] DEVICE FOR THE SETTING UP OF A DATA DISPLAY DEVICE ON A WORK SURFACE

[75] Inventors: Olav Helgeland, Nittedal; Guttorm Rudi, Fjellhamer; Odd Engely, Faren, all of Norway

[73] Assignee: Tandberg Data A/S, Oslo, Norway

[21] Appl. No.: 253,368

[22] Filed: Apr. 13, 1981

[30] Foreign Application Priority Data

Sep. 30, 1980 [DE] Fed. Rep. of Germany ....... 3036852

[51] Int. Cl.³ ............................................. A47G 29/00
[52] U.S. Cl. .................................. 248/371; 248/123.1; 248/183
[58] Field of Search .............. 248/346, 349, 371, 397, 248/415, 418, 422, 425, 179, 181, 183, 663, 678, 648, 123, 123.1, 125, 183

[56] References Cited

U.S. PATENT DOCUMENTS

| D. 253,594 | 12/1979 | Antenbring | D14/02 |
|---|---|---|---|
| 831,574 | 9/1906 | Stanley | 248/422 X |
| 1,743,210 | 1/1930 | Haffner | 248/397 X |
| 2,293,593 | 8/1942 | Clark | 248/397 X |
| 3,711,054 | 1/1973 | Bauer | 248/562 |
| 3,788,587 | 1/1974 | Stemmler | 248/562 |
| 3,936,026 | 2/1976 | Hampel | 248/425 X |
| 3,970,792 | 7/1976 | Benham | 248/183 X |
| 4,008,920 | 2/1977 | Arndt | 248/397 X |

FOREIGN PATENT DOCUMENTS

| 2847135 | 10/1978 | Fed. Rep. of Germany . |
| 346695 | 4/1931 | United Kingdom ................ 248/349 |

*Primary Examiner*—J. Franklin Foss
*Attorney, Agent, or Firm*—Hill, Van Santen, Steadman, Chiara & Simpson

[57] ABSTRACT

A system for setting up a data display device on a work surface, functions for elevation adjusting, for rotating, and for swelling the data display device. The system, which is particularly economical, has a stand with a telescope member adjustable in height thereon. A base plate is attached thereupon, and a rotary plate is supported on the base plate. The rotary plate has an arch 5 upon which sliding elements are guided, and to which the data display device is fastened.

6 Claims, 5 Drawing Figures

DEVICE FOR THE SETTING UP OF A DATA DISPLAY DEVICE ON A WORK SURFACE

BACKGROUND OF THE INVENTION

The invention concerns a device for setting up or installing a data display device on a work surface with an elevation adjustment device, a rotation device for rotation about a vertical axis, a swivelling device for swivelling around a horizontal axis, and a weight balancing device which compensates at least a part of the weight of the data display device.

When working on a data display device, one attempts to set up or install the data display device in a position in which, for example, with references to a viewing direction, distance and reflection of outside light, as few interfering influences as possible are exercised upon an operator.

It is known from the German OS No. 2,847,135, incorporated herein by reference, to set up a data display device on a supporting device. This consists of a base member and a turntable ring mounted thereupon on which, to a horizontally running shaft, a support arm is attached for elevation adjustment. On its free end, there is located a pivotable support arm for bearing a data display device which, by means of a parallel guide arranged in the support arm, always guarantees a parallel position of the data display device with respect to itself in the case of an elevation adjustment. Besides this, the supporting device displays a weight balancing device which compensates, at least approximately, the torque created by the weight of the data display device and of the support arm with respect to its first axis in any position of the support arm. The weight balancing device is formed by a torsion spring which is arranged at the swivel connection between the support arm and the turntable ring and surrounds the first axis coaxially.

Designing the weight balancing device as a torsion spring arranged in a swivel connection, however, has the disadvantages that the installation connected with an initial stress of the torsion spring is difficult to manipulate with increasing spring force of the torsion spring. Torsion springs with a small spring force, however, exclude the use of the support device for larger data display devices. The elevation adjustment with the support arm has the disadvantage that the position of the center of gravity changes in the case of the elevation adjustment so that a relatively large, or respectively, heavy base part must be used. Since the torsion spring displays no linear path of force, the elevation adjustment must proceed in dependence upon the elevation with a varying force.

SUMMARY OF THE INVENTION

It is an object of the invention to provide a device for setting up a data display device on a work surface which permits freedom of movement of the set-up. It must be possible to provide an elevation adjustment, a swivelling movement about a horizontal axis and a rotation movement about a vertical axis. The weight balancing device must also function with greater facility.

The problem is solved by means of a stand having a stationary telescope member and an extendable telescope member. A rotation device has a base plate arranged on the extendable telescope member for receiving a rotary plate. A swivel device is provided comprised of the rotary plate provided with an arch, and with at least two sliding elements arranged on the arch for bearing the data display device. A weight balancing device comprised of a linear energy storing member is also arranged on the stand.

The device of this invention is distinguished by means of a simple structure and small space requirement. The use of a linear energy storing member guarantees a constant progression of force for the elevation or height adjustment of the data display device.

According to one embodiment of the invention, the elevation adjustment device is comprised of a toothed rack arranged on the extendable telescope member and a pinion which meshes into the toothed rack and is arranged on a shaft provided with a first control grip or knob. A stationary telescope member is also provided.

The advantage of this elevation adjustment device is that it essentially is comprised of only three individual parts. According to a further embodiment, the base plate has a passage for the linear energy storage member and at least two concentrically arranged first guide slots for guiding the rotary plate. The length of the slots determines the angle of rotation of the rotary plate.

According to a further embodiment, the rotary plate has a number of second guide slots corresponding to the number of sliding elements. These guide slots point in the direction of the arch for guidance of the sliding elements.

According to another embodiment, the swivelling device is comprised of two sliding elements for supporting the data display device and two outer counter bearings or supports lying opposite the sliding elements of the guide slots. Two second connection elements are also provided which in each case are directed through one of the second guide slots and which hold the sliding elements and the outer counter bearings in a releasable connection.

The data display device is held with the releasable connections on the sliding elements and the rotary plate. By means of its weight, the sliding element is pressed onto the rotary plate so that a frictional force arises which holds the data display device in any position on the swivelling device.

According to a further embodiment, the linear accumulator is initially stressed with a force which corresponds at least to the sum of the weights of the extendable telescope member and all objects arranged thereupon, as well as a frictional force. This has the advantage that the operator only needs to expend a slight amount of force for the elevation adjustment of the data display device. The linear energy storage member has the advantage that in each elevation position, the same force must be expended.

According to another embodiment of the invention, the linear accumulator is designed as a pneumatic spring with a pressure tube and a piston rod.

According to a further embodiment, a base plate is arranged under the stand, the pressure tube of the pneumatic spring is mounted on the base plate, and the piston rod is mounted in a bearing bushing in the rotary plate.

According to a further embodiment of the invention, the first control knob is comprised of a first rotary element which is connected with a first connection element with the shaft, of a second rotary element which is connected with the first in a torsionally fixed manner, and which on the side pointing to the stationary telescope member has a rim partially encompassing the first rotary element of a spring element between the first rotary element and rim and of a brake element between the rim of the second rotary element and the stationary telescope member.

The control knob has the task of arresting the elevation adjustment device at a desired elevation. For this, the brake element is pressed against the stationary telescope member and with the frictional force arising thereby, a twisting of the shaft with respect to the stationary telescope part is prevented. The data display device can in this manner be arrested in any desired elevation.

According to a further embodiment, the brake element consists of a perforated disk and the stationary telescope member has at least one tooth for engagement into one of the perforations of the perforated disk. This embodiment has the advantage that the spring element does not need to supply the actual braking force, but rather only a force which brings the perforated disk and the tooth into engagement.

According to another embodiment, the device has three connection elements which are directed through the first guide slots and hold the rotary plate in releasable connection to the base plate.

According to a further embodiment, at least one of the third connection elements is comprised of a bolt with a nut which is designed as a control grip or knob (third control knob).

According to a further embodiment, at least one of the second connection elements is comprised of a bolt with a nut designed as a control knob (second control knob). The control knobs have the advantage that they can be attached close to the device and thereby promote freedom to move from place to place according to the setting up of the data display device.

DESCRIPTION OF THE PREFERRED EMBODIMENTS

Figure 1:
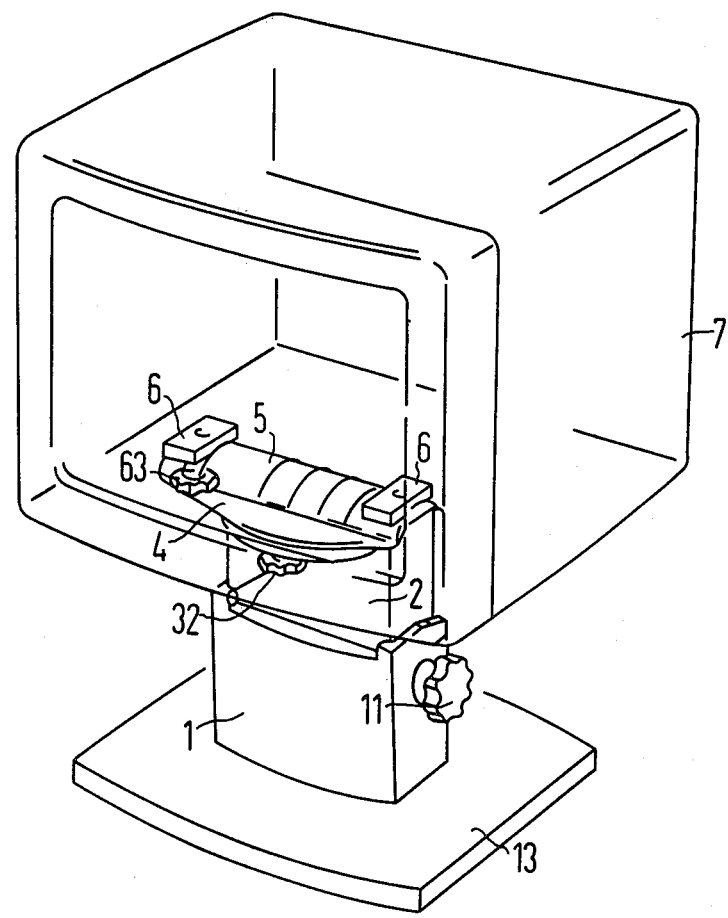
FIG. 1 shows a face of the device according to the invention.
Figure 2:
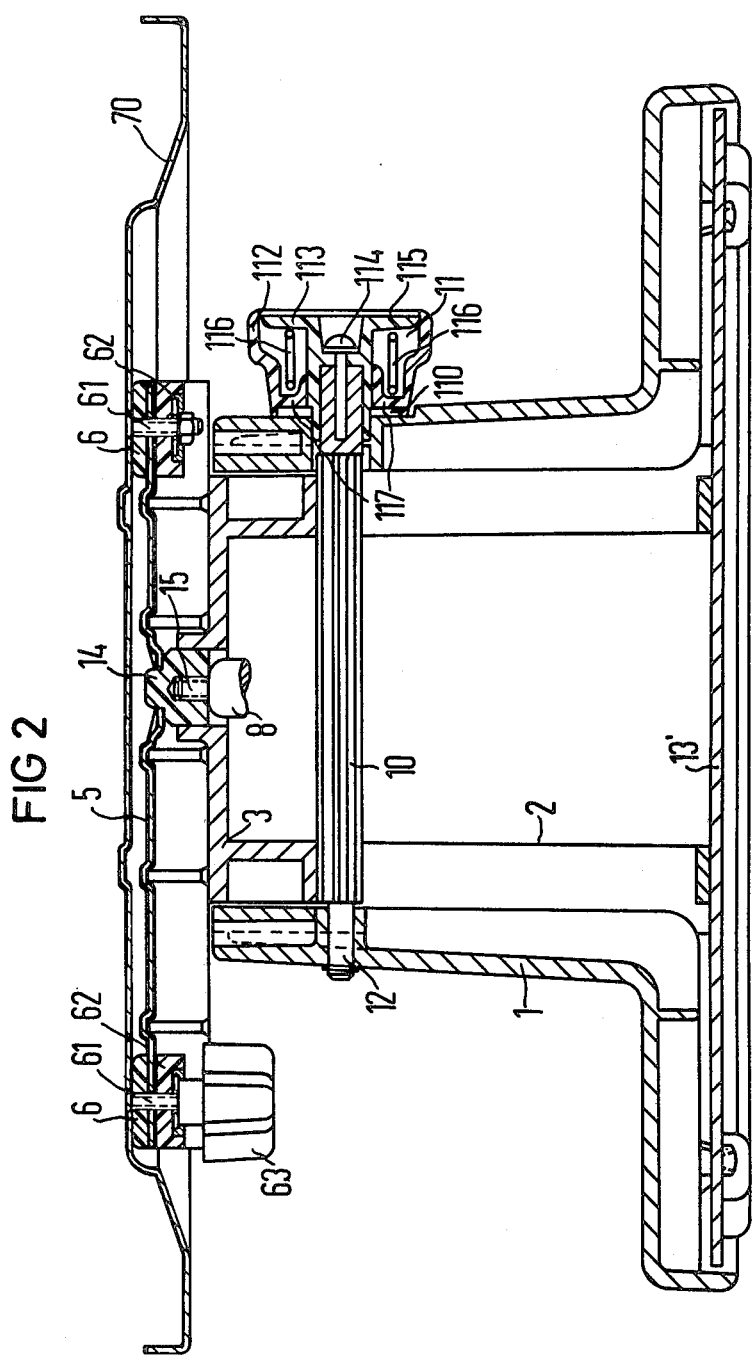
FIGS. 2 and 3 show in each case a cut side view of the device.

FIG. 1 shows the arrangement of a data display unit 7 on the device. The device is comprised of a base plate 13, of a stand having a stationary telescope member 1 and an extendable telescope member 2 which makes possible an elevation adjustment of the data display device 7. A rotary device with a rotary plate 4 is arranged on the extendable telescope member 2. A swivelling device is comprised of the rotary plate 4 provided with an arch 5 and of the sliding elements 6 arranged on the arch 5. These sliding elements bear the data display device 7. A first control knob 11 serves for manipulation of the elevation adjustment device and for arresting in a desired elevation. A second control knob 63 serves for arresting the swivel device in a desired position. On the rotary device there is located a third control knob 32 for arresting in a desired direction of rotation. The cut side view in FIG. 2 shows a base plate 13' upon which the stationary telescope part 1 is arranged. Therein, a shaft 12 is held upon which a pinion 10 is fastened. On one side of the shaft 12, the control knob 11 is fastened. On the upper end of the extendable telescope member 2, a base plate 3 is arranged which has a passage for a pneumatic spring with a pressure tube 8 and a piston rod 15. The piston rod 15 is held in a bearing bushing 14 in the arch 5 of the rotary plate 4. The pneumatic spring is an embodiment example of the weight balancing device 8, 15. On the rotary plate 4, sliding elements 6 are arranged on which a base plate 70 of a data display device 7 is held with connection elements 61, 63.

One of the connection elements 61, 63 is comprised of a bolt 61 and a nut which is designed as control knob 63. Each sliding element 6 has outer supports or abutment members 62 on the opposing sides of the rotary plate 4.

The control knob 11 is comprised of a first rotary element 113 which is connected solidly with the shaft 12 with a first connection element 114, and of a second rotary element 112 which is connected with the first rotary element 113 in a torsionally fixed manner. This latter element has on the side pointing to the stationary telescope member 1 a rim 117 which partially encompasses the first rotary element 113. Finally, the rotary element 112 also is comprised of a spring element 116 between the first rotary element 113 and the rim 117, and of a brake element 110 between the rim 117 and the stationary telescope member 1. The spring element 116 presses the second rotary element 112 against the stationary telescope member 1 and thereby generates a braking force acting via the brake element 110. This prevents an undesired rotating of the pinion 10. The brake force is released whereby the second rotary element 112 is pulled against the spring force of the spring element 116. The brake element 110 can, for example, consist of a perforated disk which engages in one or several teeth which are applied on the stationary telescope member 1.

Figure 3:
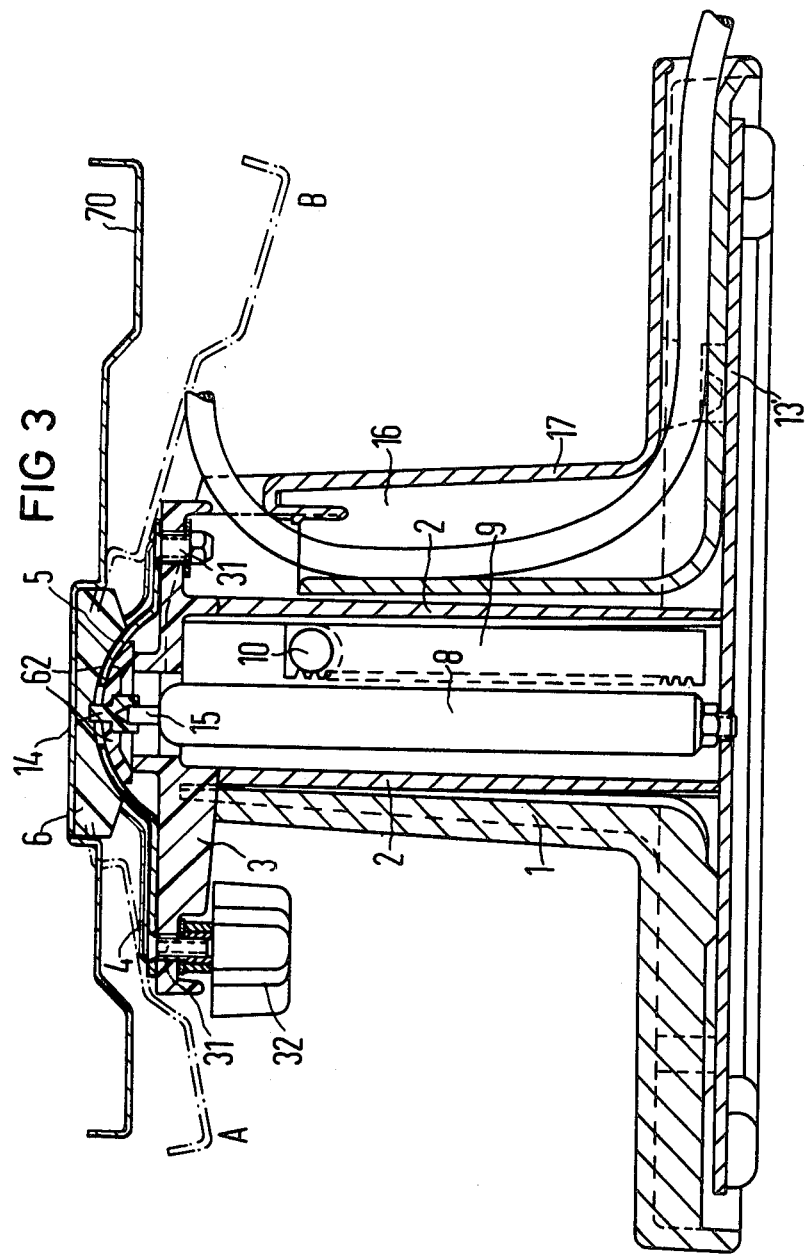

FIG. 3 shows the base plate 13', the stationary telescope member 1, the extendable telescope member 2 the base plate 3, the pneumatic spring with pressure tube 8 and piston rod 15, the bearing bushing 14, the sliding elements 6 and the outer supports 62, as well as the base plate 70 of the data display device 7.

On the extendable telescope member 2, a toothed rack 9 is supplied. It is in engagement with the pinion 10.

The rotary plate 4 is connected by third connection elements 31, 32 with the base plate 3. Accordingly, at least one of the connection elements 31, 32 consists of a bolt 31 and a nut which is designed as control grip 32.

In the case of a swivelling movement of the data display device 7, the sliding elements 6 glide on the arch 5 of the rotary plate 4. This pivot movement is limited such that in the case of a specific swivelling or pivot angle A associated with the front side of the data display device 7, or respectively, angle B associated with the back of the data display device 7, the base plate 70 of the device 7 strikes against the base plate 3. The base plate 3 is designed such that the back of the data display device 7 can be swivelled further downward than the front side.

For receiving a connection cable, for example, supply wires for the data display device 7, a cable channel 16 is provided in the foot of the stand.

Figure 4:
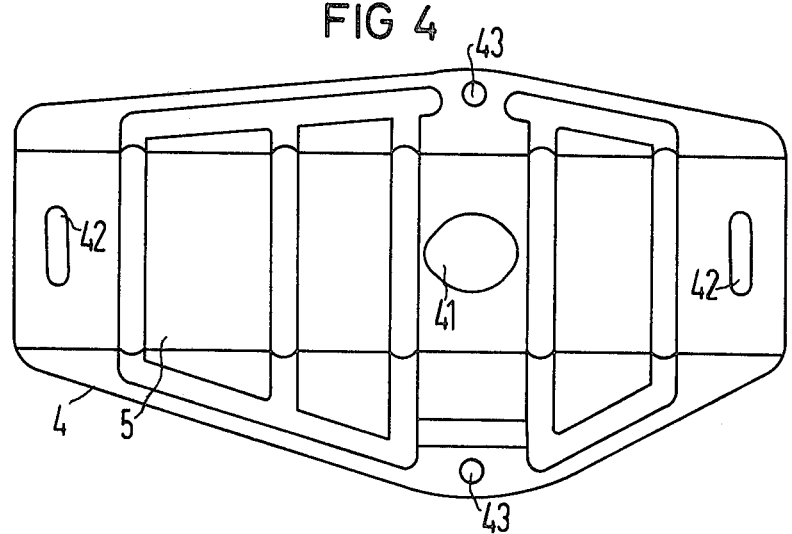
FIG. 4 shows a top view onto a rotary plate of the inventive device.

FIG. 4 shows the rotary plate 4 with the curvature arch 5 thereon. It has an opening 41 for receiving the bearing bushing 14. With 42, guide slots pointing in the direction of the arch are designated for guiding the sliding elements 6. Through them, the bolts 61 are passed with which the base plate 70, the sliding elements 6, and the outer supports or abutment members 62 are held fast. The rotary plate 4 is connected by means of first bolts 31 which are passed through bore holes 43 with the base or support plate 3 which lies thereunder.

Figure 5:
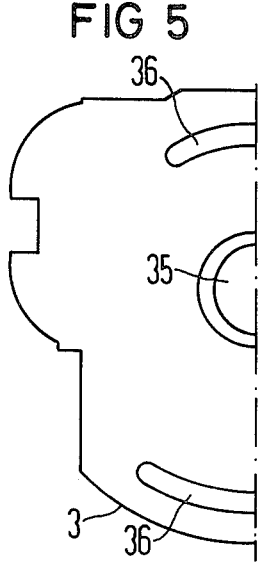
FIG. 5 shows a top view onto a base plate for supporting the rotary plate of FIG. 4.

FIG. 5 shows the base plate 3 with concentrically arranged first guide slots 36 through which the first bolts 31 are passed. The base plate 3 has a passage 35 for the linear energy storing member 8, 15.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A system for setting up a data display device on a work surface, comprising: an elevation adjustment means; rotation means for rotation of the device about a vertical axis; swivel means for swivelling or tilting the device about a horizontal axis; a weight balancing means for compensating at least a portion of a weight of the data display device; a stand having a stationary telescope member and an extendable telescope member in cooperation therewith; a base plate arranged on the extendable telescope member which receives a rotary plate in rotary fashion; said swivel means comprising the rotary plate provided with an arch, and at least two sliding elements arranged on the arch for bearing the data display device; said weight balancing means comprising a substantially linear energy storage member arranged on the stand; said elevation adjustment means comprising a toothed rack arranged on the extendable telescope member and a pinion which engages in the toothed rack, said pinion being arranged on a shaft which is provided with a first control knob located on the stationary telescope member; the base plate having a passage for the linear energy storage member and at least two concentrically arranged base plate guide slot means for guiding rotation of the rotary plate; two rotary plate guide slot means corresponding to the two sliding elements of the swivel means which run in a direction of the arch for guiding the sliding elements; said swivel means comprising two outside supports or abutment members lying opposite the sliding elements at the rotary plate guide slot means, and first connection element means aligned through the rotary plate guide slot and which holds the sliding elements and the outside abutment members in a releasable connection; second connection element means passing through said base plate guide slot means and which hold the rotary plate to the base plate in a releasable slidable connection to permit rotation of the rotary plate relative to the base plate; and said second connection element means including a screw with a nut designed as a control knob.

2. A system according to claim 1 wherein the linear energy storage member is prestressed with a force which corresponds at least to a sum of a weight of the extendable telescope member and all objects arranged thereupon, as well as a frictional force associated therewith.

3. A system according to claim 1 wherein the linear energy storage member is designed as a pneumatic spring with a pressure tube and a piston rod.

4. A system according to claim 3 wherein a bottom base plate is arranged under the stand, the pressure tube of the pneumatic spring is mounted on the bottom base plate, and its piston rod is mounted in a bearing bushing positioned on the rotary plate.

5. A system according to claim 1 wherein said first control knob comprises a first rotary element connected with said shaft by a first connection element, and a second rotary element connected with the first in a torsionally fixed manner, on a side pointing to the stationary telescope member a rim which partially encompasses the first rotary element, a spring element between the first rotary element and the rim, and a brake element between the rim of the second rotary element and the stationary telescope member.

6. A system according to claim 5 wherein the brake element comprises a perforated disk, and that the stationary telescope member has at least one part for engagement into one of the perforations of the perforated disk.

* * * * *